United States Patent
Turullols et al.

(10) Patent No.: US 11,709,522 B1
(45) Date of Patent: Jul. 25, 2023

(54) POWER AND TEMPERATURE DRIVEN CLOCK THROTTLING

(71) Applicant: XILINX, INC., San Jose, CA (US)

(72) Inventors: Sebastian Turullols, Los Altos, CA (US); Ravinder Sharma, Hyderabad (IN); Siva Santosh Kumar Pyla, Hyderabad (IN); Raj Kumar Rampelli, Hyderabad (IN); Deboleena Minz Sakalley, Hyderabad (IN); Nilay Shah, Thane (IN)

(73) Assignee: XILINX, INC., San Jose, CA (US)

( * ) Notice: Subject to any disclaimer, the term of this patent is extended or adjusted under 35 U.S.C. 154(b) by 3 days.

(21) Appl. No.: 17/023,016

(22) Filed: Sep. 16, 2020

(51) Int. Cl.
*G06F 1/26* (2006.01)
*G06F 1/08* (2006.01)

(52) U.S. Cl.
CPC . *G06F 1/08* (2013.01); *G06F 1/26* (2013.01)

(58) Field of Classification Search
CPC ........ G06F 1/206; G06F 1/324; G06F 1/3281; G06F 1/08; G06F 1/26
See application file for complete search history.

(56) References Cited

U.S. PATENT DOCUMENTS

| | | | | |
|---|---|---|---|---|
| 6,807,638 B1* | 10/2004 | Moyal | ................... | H04J 3/0685 713/400 |
| 6,988,217 B1* | 1/2006 | Madrid | ..................... | G06F 1/08 713/502 |
| 8,561,120 B2* | 10/2013 | Will | ................. | H04N 21/43637 710/24 |
| 11,126,255 B1* | 9/2021 | Sok | ............................ | G06F 1/28 |
| 2002/0083354 A1* | 6/2002 | Adachi | ................... | G06F 1/206 713/322 |
| 2005/0102539 A1* | 5/2005 | Hepner | ................... | G06F 1/206 713/300 |
| 2008/0284476 A1* | 11/2008 | Kwan | ....................... | H03L 7/06 327/156 |
| 2011/0055596 A1* | 3/2011 | Wyatt | ..................... | G06F 1/206 713/300 |
| 2013/0227329 A1* | 8/2013 | Leibowitz | ............. | G06F 1/3237 713/400 |
| 2016/0291625 A1* | 10/2016 | Tripathi | ................ | G06F 1/3296 |
| 2020/0029284 A1* | 1/2020 | Muthaiyan | ............ | G06F 1/3234 |
| 2020/0371828 A1* | 11/2020 | Chiou | ................ | G06F 11/0709 |
| 2021/0259133 A1* | 8/2021 | Narasimhan | ....... | H05K 7/20318 |
| 2022/0113784 A1* | 4/2022 | Alben | .................. | G06F 1/3215 |

* cited by examiner

*Primary Examiner* — Zahid Choudhury
(74) *Attorney, Agent, or Firm* — Patterson + Sheridan, LLP (57) ABSTRACT

Embodiments herein describe techniques for managing power consumption and temperature in an electronic circuits or integrated chips driven by clock signals (collectively referred to as "cards") by throttling the clock signals on those cards. The cards often allow users to implement customized hardware acceleration functions via Field Programmable Gate Arrays or the like, which can lead to variable workloads on different cards (or regions of individual cards) based on the customized functionality. By throttling the clock signal based on continuously monitored power consumption or temperature, the user is enabled to use the card more aggressively (e.g., based on average rather than worst-case power consumption), and the card automatically throttles operations when power consumption or temperature exceeds operational thresholds.

18 Claims, 6 Drawing Sheets

POWER AND TEMPERATURE DRIVEN CLOCK THROTTLING

TECHNICAL FIELD

Examples of the present disclosure generally relate to managing power usage and temperature in electronics.

BACKGROUND

Various electronic circuits and integrated chips are driven by clock signals to perform computing operations. Generally, the faster the clock signal cycles, the more computing operations are performed within a given time span. However, performing more computing operations within a given time span generally consumes more power in that time span than if fewer computing operations were performed. Additionally, by consuming a higher amount of power in a given time span, the electronic circuit or integrated chip generates a correspondingly greater amount of heat in that time span. Various electronic circuits and integrated chips have operational thresholds set to control the buildup of heat and can use various heat sinking or transfer mechanisms to keep the temperature within the operational thresholds.

SUMMARY

One embodiment described herein is a computing system, comprising: a host; and a peripheral device comprising: a communication interface configured to couple to the host; a dynamic clock configured to generate a clock signal that changes based on at least one of a power consumption in the peripheral device or a temperature of the peripheral device; and computing resources configured to perform operations offloaded from the host to the peripheral device via the communication interface, wherein the operations are performed at a performance rate set by the clock signal.

One embodiment described herein is an integrated circuit, comprising: a communication interface; a dynamic dock configured to generate a dock signal that changes based on at least one of a power consumption in the integrated circuit or a temperature of the integrated circuit; and computing resources configured to perform operations provided to the integrated circuit via the communication interface, wherein the operations are performed at a performance rate set by the clock signal.

One embodiment described herein is a method, comprising: determining whether at least one of a power consumption or a temperature for a card exceeds a threshold; and in response to determining that at least one of the power consumption or the temperature exceeds the threshold, reducing a clock frequency of a clock that controls logical operations performed on the card.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques for managing power consumption and temperature in an electronic circuits or integrated chips driven by clock signals (collectively referred to as "cards") by throttling the clock signals on those cards. In various embodiments, the cards can include expansion cards that are designed for performing general or specific computing functions within a computing device, such as, for example, an accelerator card, graphics card, memory expansion card, etc., in a personal computer. The cards often allow users to implement customized hardware acceleration functions, which can lead to variable workloads on different cards (or regions of individual cards) based on the customized functionality.

The customized functionalities offered by some cards allow those cards to be used in a wider set of use scenarios and for users to update the cards with new or improved functionalities over time, but can complicate how the user manages power usage and manages temperature in the card. Even in cards with fixed logic, or mixtures of fixed and customizable logic, designers and users need to respect various thresholds for power consumption and temperatures to avoid damaging the card or causing the card to perform erratically. For example, designers and users use various models based on a worst-case power consumption profile for the cards to ensure that the card operates within power and temperature thresholds. The worst-case power consumption profile, however, can be based on the predicted highest demand for power in the card, which in practice can be very short in duration. Accordingly, the models tend to pessimistic to plan for card usage based on the highest power usage, which can lead to inferior choices in how to program and operate the cards for typical (non-worst-case) power consumption.

By throttling the clock signal based on continuously monitored power consumption or temperature, the user is enabled to use the card more aggressively (e.g., based on average rather than worst-case power consumption), and the card automatically throttles operations when power consumption or temperature exceeds operational thresholds to account for the worst-case scenarios. For example, instead of a card having X Watts of total available power operating N Intellectual Property (IP) core blocks divided evenly with X\N Watts of power for each IP core block, each IP core can be operated up to its maximum power rating until the total power consumption reaches X Watts of power or T temperature. In another example, instead of having N instances of an IP core based on the worst-case power consumption of those IP cores, the card can include M instances (where M>N) of that IP core even though operating each of the M instances at their maximum power consumption would exceed the total power available to the card. Once the card reaches the power or temperature threshold, one of more IP cores are throttled by reducing the clock frequency supplied to those IP cores, allowing the power to be shared to other IP cores within the power threshold or allowing the card to cool down.

Figure 1:
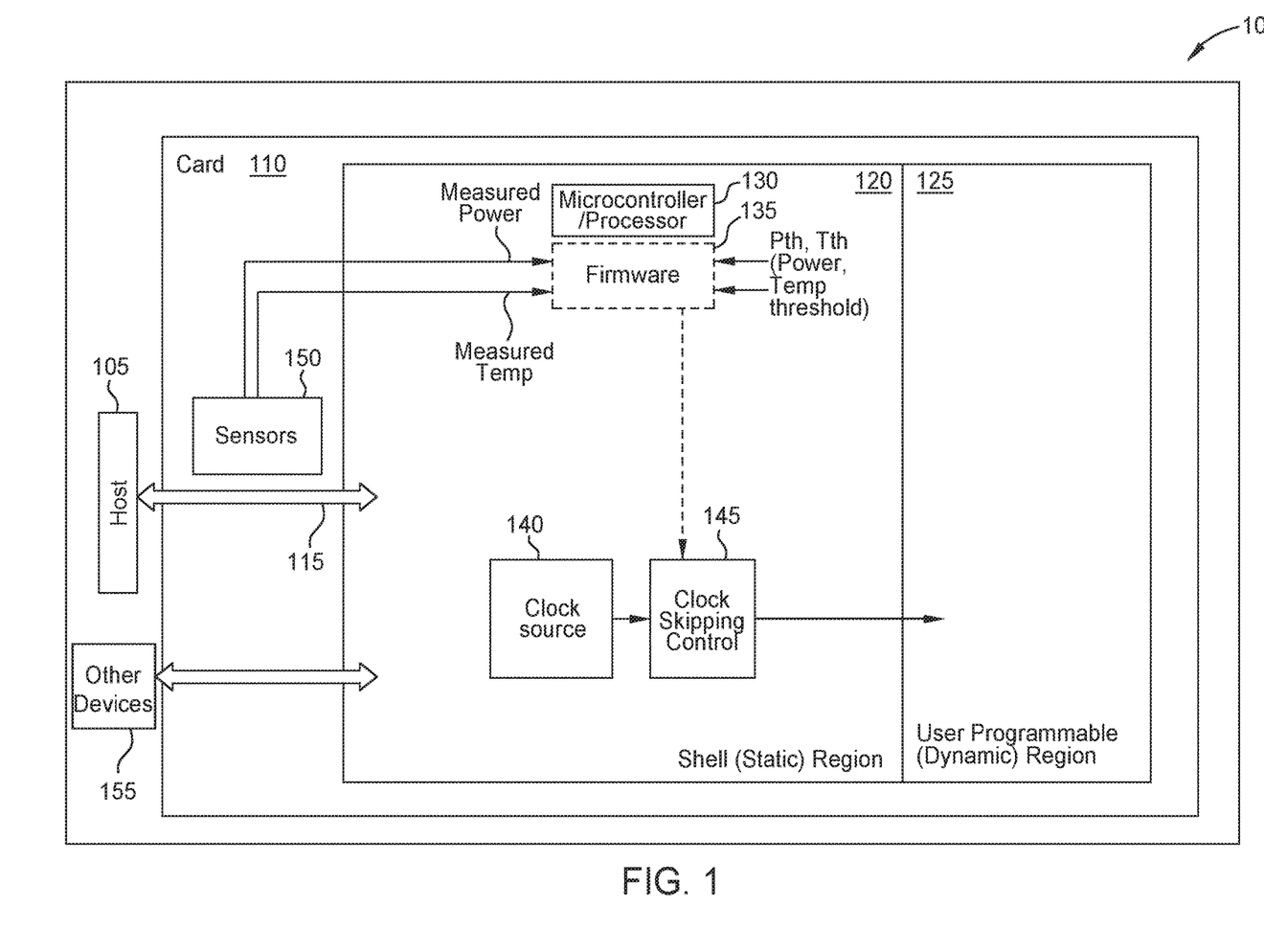
FIG. 1 illustrates an architecture of a computing system including of a card configured for clock throttling, according to an example.

FIG. 1 illustrates an architecture of a computing system 100 including of a card 110 configured for clock throttling, according to an example. The card 110 can include various types of expansion cards and peripheral devices from which one or more operations are offloaded from a host 105 or more general-purpose processing device via an interface 115.

The host 105 includes one or more processors and memory. The processors represent any number of processing elements which each can contain any number of processing cores. The memory can include volatile memory elements, non-volatile memory elements, or a combination of both. The processors and memory can execute instructions stored in the memory to perform various computing functions, which can include tasks submitted to the card 110 to perform in the various logic encoding regions thereof.

In various embodiments, the card 110 is a hardware accelerator card, a graphics card, or the like, which is connected to a host 105 including a Central Processing Unit (CPU) via a PCIe (Peripheral Component Interface Express) link interface 115. Although illustrated as connecting the host 105 and the card 110, in various embodiments the link interface 115 connects the card 110 to additional or different elements within the computing system 100 including hard drives and other memory devices or other cards (generally, other devices 155).

The card 110 includes various logic encoding regions, such as IP cores, provided by LUTs (Look Up Tables), FGPAs (Field Programmable Gate Arrays), ASICs (Application Specific Integrated Circuits), GPU (Graphics Processing Unit), a SoC (System on a Chip) or other integrated logic devices to perform functions offloaded from the host 105 (or another card 110). The logic encoding regions of the card 110 are generally classified into two portions: a static region 120 with fixed logic and a dynamic region 125 with user programmable logic. Although generally discussed as including both a static region 120 and a dynamic region 125, in various embodiments, the card 110 can omit the dynamic region 125. The card 110 can also omit the physical separation between static and dynamic region allowing user programming logic to get implemented across a completer FPGA (Field Programmable Gate Array) device with static region logic. The static region 120 and the dynamic region 125 are generally referred to as computing resources, and provide the functionality of running the logic offloaded from the host 105 (or other card 110), returning processed results to the host 105 (or another card 110), and managing operations of the card 110.

In one embodiment, the card 110 can include a printed circuit board (PCB) (e.g., a substrate) where the regions 120/125 are separate integrated circuits (e.g., semiconductor chips) that are mounted onto the PCB. The PCB can include sockets where these integrated circuits plug into the PCB. That way, the integrated circuits can be hot-swapped (e.g., one integrated circuit that performs a first I/O function is removed from a socket and replaced by a second integrated circuit that performs a second I/O function), In another embodiment, the card 110 can be a system in a package (SIP) where the integrated circuits for the regions 120/125 are enclosed in one or more chip carrier packages. Although the logic regions might not be able to be hot-swapped when in a SIP, the embodied functionalities can still be selectively activated and deactivated (e.g., hot-added and hot-removed).

In yet another embodiment, the card 110 is a SoC where all the components in the card 110 are included in the same integrated circuit or chip. The SoC can include hardened logic for implementing the static regions 120 where the functions can be activated or deactivated (e.g., hot added or hot removed). Alternatively, the SoC can include programmable logic for implementing the dynamic regions 125 so that the functions can be hot swapped, where the programmable logic for one function is reconfigured so that the programmable logic performs a different function. In other embodiments, the card 110 can be an FPGA where the circuitry illustrated in the card 110 is implemented in programmable logic or an ASIC where the circuitry is implemented using hardened logic.

Regardless of the specific implementation of the card 110, the functions can be activated or deactivated while the computing system 100 is operating (e.g., hot-added or hot-removed) by physically removing integrated circuits, deactivated/activating hardened logic, or reprogramming programmable logic. In some embodiments, the functions can be hot swapped by replacing a first integrated circuit with another integrated circuit on a substrate (e.g., a PCB) or reconfiguring programmable logic that previously performed a first function to perform a second function. Other functions in the card 110 that are not affected by the hot swap/add/remove can continue to operate in parallel.

In the present example, the card 110 includes a microcontroller 130 or other processor to execute firmware 135 which includes functionality to control the clock speed at which the various logic is performed on the card 110. In other examples, hardware-defined logic or programmable logic includes the functionality to control the clock speed at which the various logic is performed on the card 110. Although certain examples may be provided herein with reference to one of firmware-defined, hardware-defined control, or programmatically-defined functionality, the present disclosure shall be understood to be applicable in any of firmware-defined, hardware-defined, and programmatically-defined scenarios. A clock source 140 on the card 110 produces a clock signal at an initial clock rate that can be changed via a clock skipping controller 145. The firmware 135 executed by the microcontroller 130 receives sensor readings from one or more sensors 150 included in the card 110 that indicate the power consumption of the card 110 and/or temperature of the card 110.

In some embodiments, depending on the power consumption for the card 110 reported by the sensors 150, the firmware 135 signals the clock skipping controller 145 to reduce or throttle the rate of the dock signal output to the computing resources when the power consumption exceeds a power consumption threshold, and to return to the initial clock rate when power consumption returns below the threshold. In some embodiments, the firmware 135 signals the clock skipping controller 145 to reduce or throttle the rate of the clock signal output to the computing resources when the temperature exceeds a temperature threshold, and to return to the initial clock rate when temperature returns below the threshold.

In various embodiments, the microcontroller 130 can include several power consumption and/or temperature thresholds and use different thresholds for when to reduce or increase the clock rate. For example, a first temperature threshold is set for 80 degrees Celsius to cause the clock skipping controller 145 to reduce the clock rate, while a second temperature threshold is set for 70 degrees Celsius to cause the dock skipping controller 145 to return the clock rate to the initial rate. Accordingly, when the temperature of the card 110 exceeds 80 degrees Celsius, the clock rate is reduced to help cool the card 110, and the clock rate remains reduced until the card temperature drops below 70 degrees Celsius. In another example, a first temperature threshold is set for 80 degrees Celsius to cause the clock skipping controller 145 to reduce the dock rate to a first reduced rate that is slower than an initial rate, while a second temperature threshold is set for 90 degrees Celsius to cause the clock skipping controller 145 to further reduce the clock rate to a second reduced rate that is slower than the first reduced rate.

In some embodiments, the firmware 135 can reduce the clock rate based on one of the power consumption or temperature of the card 110, and wait to return to the initial clock rate based on the other one or both of the power consumption or temperature of the card 110. For example, when clock signal is throttled in response to the power consumption of the card 110 exceeding a power consumption threshold of X Watts, the dock signal remains throttled until the power consumption falls below X Watts and the temperature of the card 110 is below a temperature threshold.

Figure 2:
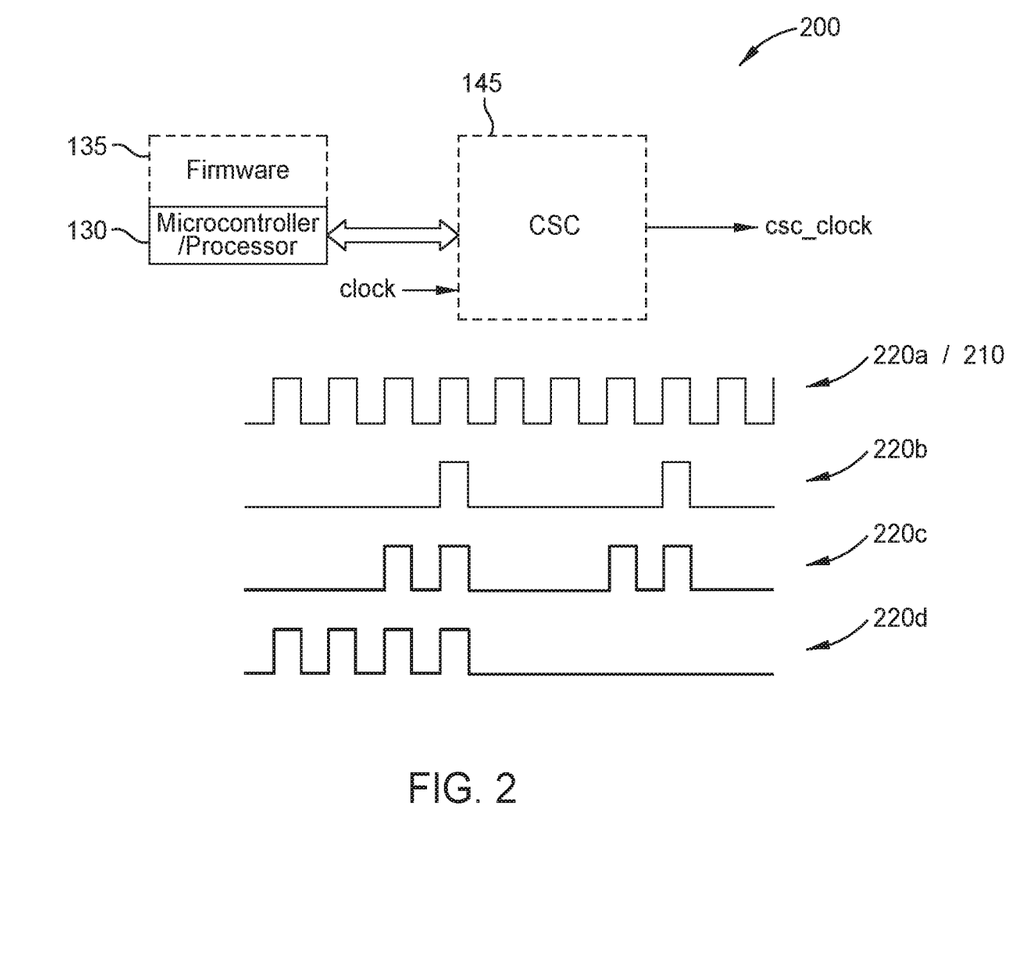
FIG. 2 illustrates a clock control arrangement with throttleable clock rates, according to an example.

FIG. 2 illustrates a dock control arrangement 200 with throttleable dock rates, according to an example. As illustrated, the microcontroller 130 runs firmware 135 to control the dock skipping controller 145 to receive an initial clock signal 210 and produce various output dock signals 220a-d based on at least one of the power consumption in the card 110 and the temperature of the card 110. The dock source and the dock skipping controller 145 together provide a dynamic clock configured to generate a dock signal that changes based on at least one of a power consumption in the peripheral device or a temperature of the card 110. In one example, the first output dock signal 220a has the same dock rate as the input initial dock signal 210 (e.g., when the power consumption and temperature are below the respective thresholds for throttling or satisfy respective thresholds for returning to the initial clock rate).

However, when the power consumption threshold or temperature threshold is satisfied, the clock skipping controller 145 can produce an output clock signal based on a duty cycle that reduces the effective clock rate, to thereby control the power consumption (and heat generation) in the card 110. For example, the second output clock rate 220b is throttled to a lower rate than the initial clock signal 210, that evenly or regularly skips clock cycles, such as the illustrated 2:1 skipping ratio, which reduces the clock rate to half of the initial clock rate. In another example, the third output clock signal 220c exhibits a two-on-two-off pattern that reduces the clock rate to half of the initial clock rate, but clusters when the dock signals are passed through. In a further example, the fourth output clock signal 220d also reduces the clock rate to half of the initial dock rate, but by passing through the initial clock signal 210 for a first time period and skipping the clock output for a second period.

Figure 3:
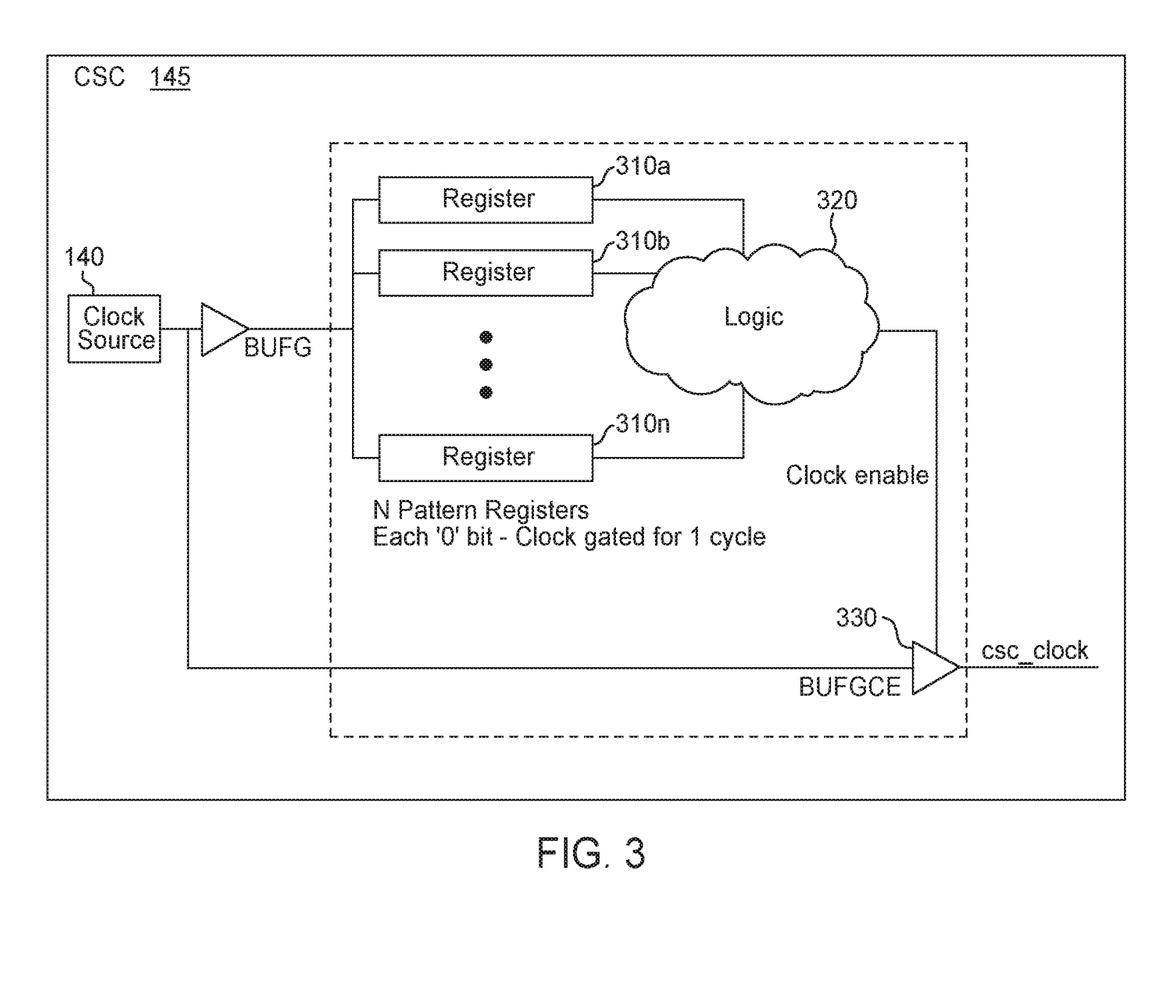
FIG. 3 illustrates a register layout in the clock skipping controller to adjust a clock rate to a selected portion and pattern of the initial clock signal, according to an example.

FIG. 3 illustrates a register layout in the clock skipping controller 145 to adjust a clock rate to a selected portion and pattern of the initial clock signal, according to an example. In some embodiments, the clock skipping controller 145 is implemented in an IP block with a plurality of pattern registers 310a-n that hold a pattern to determine what portion of an initial clock signal received from a clock source 140 is provided in an output clock signal. When activated in response to the microcontroller 130 identifying that one of a temperature threshold or power consumption threshold is satisfied, clock skipping logic 320 applies a pattern from the pattern registers 310a-n to a clock enable pin 330 to skip a cycle in the input clock signal (e.g., when the pattern presents TRUE/1) or allow a cycle in the input clock signal (e.g., when the pattern presents FALSE/0). As will be appreciated, the clock enable pin 330 may be configured to skip a clock signal with either a TRUE/1 or a FALSE/0 in the pattern and pass a clock signal with a different one of TRUE/1 or FALSE/0.

Changing the actual dock rate of the clock source 140 can require reprogramming a phase lock loop (PLL) providing the clock signal, which is a slow and disruptive process that is generally unsuitable for on-the-fly adjustments. Instead, by changing the output clock signal by skipping individual clock cycles according to a pattern the card 110 can change the effective frequency of the clock signal to control power consumption and temperature at runtime while allowing the clock source 140 to maintain a static clock rate.

The output clock signal has an effective frequency as indicated in Formula 1 below, where $F_{max}$ is the initial rate of the input clock signal and $R_{size}$ is the total size in bits of the pattern registers 310a-n $$F_{max}>=\text{Effective Frequency}>=F_{max}/R_{size} \qquad \text{[Formula 1]}$$

For example, with set of pattern registers with 256 bits (i.e., Rsize=256) and an initial clock rate of 300 MHz (i.e., Fmax=300 MHz), the output signal rate can be adjusted in steps of 1.17 MHz from 300 MHz to 1.17 MHz. As will be appreciated, longer or shorter patterns can be used in corresponding larger or smaller sets of pattern registers 310, and the number and size on the pattern registers 310 in the set can be varied to accommodate different sizes of patterns.

The pattern held in the registers is applied repeatedly to the clock skipping controller 145 so that once the last bit in the final pattern register 310n is read, the pattern is read again from the beginning from the first bit in the first pattern register 310a. The microcontroller 130 can load various patterns into the pattern register from the firmware 135 based on the threshold identified as being satisfied. As will be appreciated, the clock skipping controller 145 can set various duty cycles in addition to those illustrated in FIG. 2 by skipping various portions according to various patterns of the initial clock signal 210. The clock skipping controller 145 can select what portion of the initial clock signal 210 (e.g., a quarter, half, two-thirds, seven-eighths, etc.) and what pattern of the initial clock signal 210 is passed through based on the threshold satisfied and system settings. For example, the a first pattern associated with a first threshold can evenly pass and skip clock cycles in the initial clock signal 210 (e.g., 00010001 or 01010101) while a second pattern associated with a second threshold can sequentially cluster which clock cycles are passed or skipped (e.g., 11001100 or 11110000).

Figure 4:
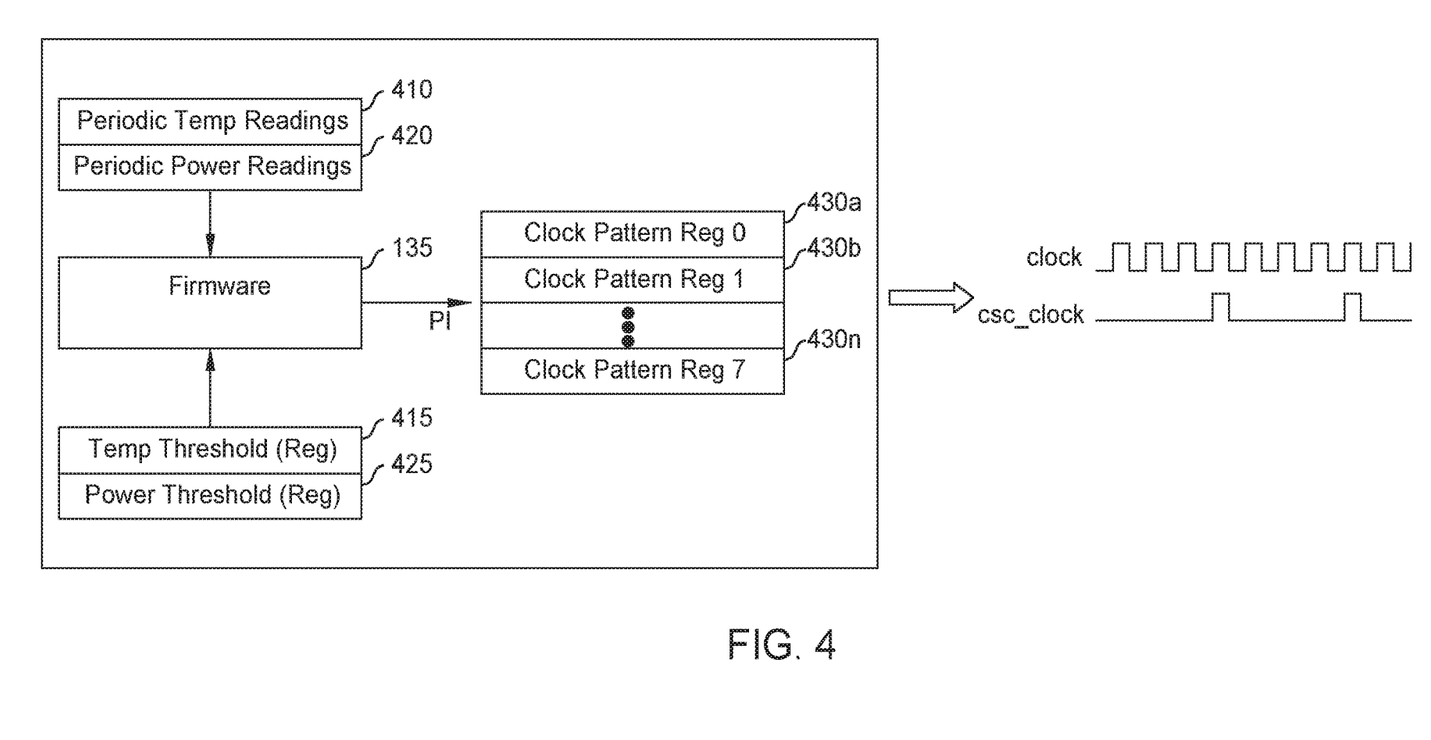
FIG. 4 illustrates control logic implementation for the firmware to selectively throttle a clock signal, according to an example.

FIG. 4 illustrates control logic implementation for the firmware 135 to selectively throttle a clock signal, according to an example. In various embodiments, the firmware 135 is executed as a control loop on the microcontroller 130, which references periodic temperature readings 410 against one or more temperature thresholds 415 and references periodic power readings 420 against one or more power consumption thresholds 425 to output one or more clock patterns 430a-n (generally or collectively, clock patterns 430) to the various pattern registers 310 in the clock skipping controller 145. In various embodiments, the temperature thresholds 415 and the power consumption thresholds 425 can be hard coded into the firmware 135 or can be programmatically set (and reset).

In various embodiments, the firmware 135 aggregates several temperature readings 410, either over time or from different sensors located at different locations on the card 110 to compare against associated temperature thresholds 415. In one example, the firmware 135 aggregates several temperature readings 410 from one sensor over a window of time to determine a running average temperature from that sensor, which the firmware 135 compares against a temperature threshold 415 localized to that sensor to determine whether or how to throttle the clock signal, in another example, the firmware 135 aggregates several temperature readings 410 taken at substantially the same time (e.g., within a predefined time window) from several different sensors located at different locations on the card 110, which the firmware 135 compares against a temperature threshold 415 averaged across the body of the card 110 to determine whether or how to throttle the clock signal In various embodiments, the firmware 135 aggregates several temperature readings 410, either over time or from different sensors located at different locations on the card 110 to compare against associated temperature thresholds 415. In one example, the firmware 135 aggregates several temperature readings 410 from one sensor over a window of time to determine a running average temperature from that sensor, which the firmware 135 compares against a temperature threshold 415 localized to that sensor to determine whether or how to throttle the clock signal. In another example, the firmware 135 aggregates several temperature readings 410 taken at substantially the same time (e.g., within a predefined time window) from several different sensors located at different locations on the card 110, which the firmware 135 compares against a temperature threshold 415 averaged across the body of the card 110 to determine whether or how to throttle the clock signal. In various embodiments, the temperature thresholds 415 associated with different aggregations of the temperature readings 410 can have the same temperature value or different temperature values as one another.

In various embodiments, the firmware 135 aggregates several power readings 420, either over time or from different sensors located at different locations on the card 110 (e.g., on different power supplies) to compare against associated power consumption thresholds 425. in some embodiments, each power supply/power sensor is associated with an individual power threshold. For example, the card 110 can have several different power supplies such as VCCINT (which powers the FPGA core logic including DSPs (Digital Signal Processors), BRA ifs (Block Random Access Memory), CLBs (Configurable Logic Block), etc.), and depending on the power budget of the card 110, and what share of that budget is allocated to a given supply lane, each supply lane can have an individual maximum tolerance on the power as well as on the peak current. Continuing the example, when VCCINT is set to 1 Volt, and the maximum power for VCCINT is 15 Watts, results in a current threshold of 15,000 milliamps (mA) for the VCCINT power supply, In general, thresholds can include power based or peak current based thresholds.

In various embodiments, the firmware 135 aggregates several power readings 420 from one sensor over a window of time to determine a running average power from a sensor associated with a given IP block (or group of blocks), which the firmware 135 compares against a power threshold 415 localized to that block (or group of blocks) to determine whether or how to throttle the clock signal, In another example, the firmware 135 aggregates several power readings 420 taken at substantially the same time (e.g., within a predefined time window) from several different sensors located at different locations on the card 110, which the firmware 135 compares against a power threshold 415 averaged across the blocks of the card 110 to determine whether or how to throttle the clock signal. In some embodiments, the aggregated power readings 420 include a total power demand from the logic blocks of the card 110.

By controlling the clock rate in response to measured temperature and power consumption readings, the firmware 135 allows for each logic block on the card 110 to operate up to associated individual limits (whether temperature or power consumption). For example, where the sum of the individual power consumption thresholds for a plurality of logic blocks can be greater than an aggregated power consumption threshold 425 for the card 110. Stated differently, when an individual logic block of N logic blocks is rated to draw X Watts, the firmware 135 allows that logic block to draw up to X Watts of power, even when the power consumption threshold 425 for the card 110 is less than N*X Watts. For example, several logic blocks can draw less than X Watts, which allows one or more other logic blocks to draw up to X Watts, and so long as the total power consumption for the card 110 remains below the power consumption threshold 425 set for the card 110. Similarly, the firmware 135 allows the logic blocks to operate at different temperatures while operating the card 110 as a whole (or individual logic blocks) at a lower average temperature.

The firmware 135 can include several different temperature thresholds 415 and power consumption thresholds 425 that are associated with different clock patterns 430. For example, a first threshold (temperature or power) is associated with reducing a clock rate in the clock signal to a predefined fraction of the initial clock rate (e.g., to conserve power or allow the card 110 to cool), while a second threshold (temperature or power) is associated with returning a reduced-rate clock signal to the initial clock rate (e.g., once the power demand or temperature drops permit full-speed operations). The temperature thresholds 415 associated with different aggregations of the temperature readings 410 can have the same temperature value or different temperature values as one another. Similarly, the power consumption thresholds 425 associated with different aggregations of the power readings 420 can have the same power value or different power values as one another.

Figure 5A:
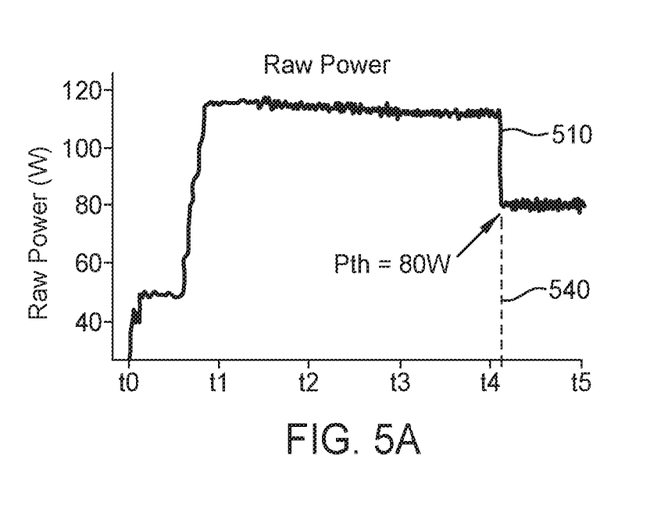
FIGS. 5A-5C illustrate various sensor readings related to a card undergoing clock throttling, according to an example.
Figure 5B:
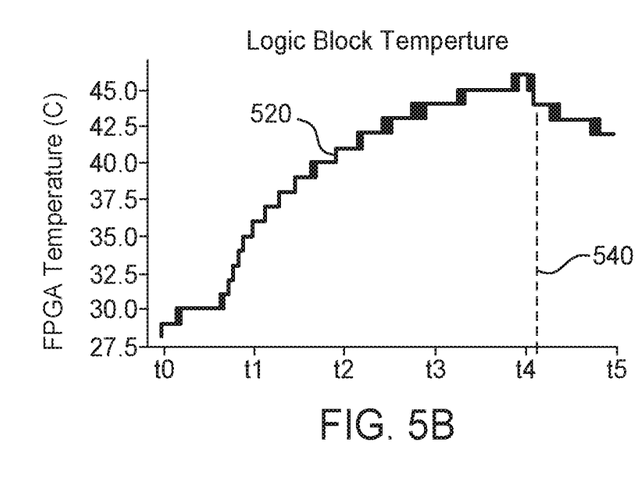
Figure 5C:
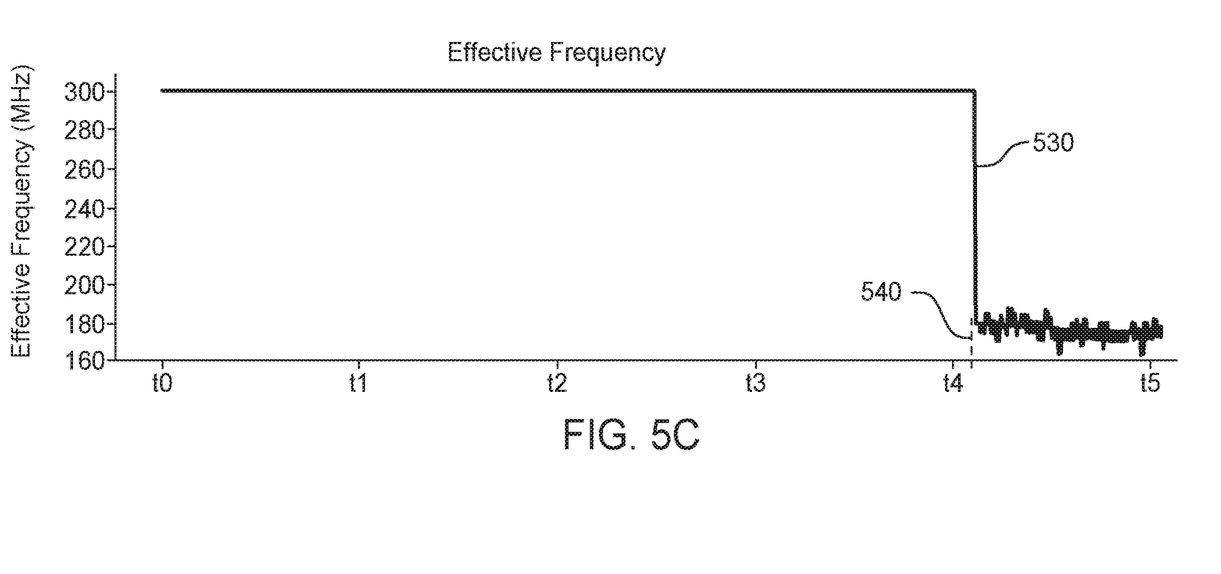

FIGS. 5A-5C illustrate various sensor readings related to a card 110 undergoing clock throttling, according to an example. FIGS. 5A-5C respectively illustrate the effective clock frequency 510 on a card 110, a total power consumption 520 for a card 110, and an average temperature 530 of the card 110 over the same time range ($t_0$-$t_{10}$). At time to 540, a threshold to initiate clock throttling is satisfied, as can be seen in FIG. 5A, where the effective clock frequency 510 is reduced from 300 MHz to less than 200 MHz.

The associated effects of reducing the effective clock frequency 510 on the total power consumption 520 are shown in FIG. 56, which shows a drop in total power consumption 520 from approximately 110 Watts to approximately 80 Watts. As will be appreciated, throttling the clock signal on the card affects different logic blocks differently. For example, consider a card 110 with two logic blocks, with first logic block consuming 100 Watts at time t7 and a second logic block consuming 10 Watts at time t7. After time t8 540, when the clock rate is reduced by approximately one third (e.g., from 300 MHz to 200 MHz), the first logic block would have a similarly reduced individual power consumption (e.g., from 100 Watts to 66 Watts). The second logic block in this example, however, could increase its relative share of processing performed on the card 110 and increase an associated individual power draw up to 14 Watts for the total power consumption 520 after time t8 to remain at or under 80 Watts total.

The associated effects of reducing total power consumption 520 on the logic block temperature 530 are shown in FIG. 5C, which shows total temperature climbing from time t0 to time t8, and dropping from time t8 to time t10. When the effective clock frequency 510 is throttled to a lower frequency, each logic block performs calculations at a slower speed, thus requiring less power over a given period of time. By reducing the number of calculations performed over a given period of time and the associated power needed to perform those calculations, the card 110 produces less heat, and thus is able to dissipate more heat and reduce its temperature over time.

Figure 6:
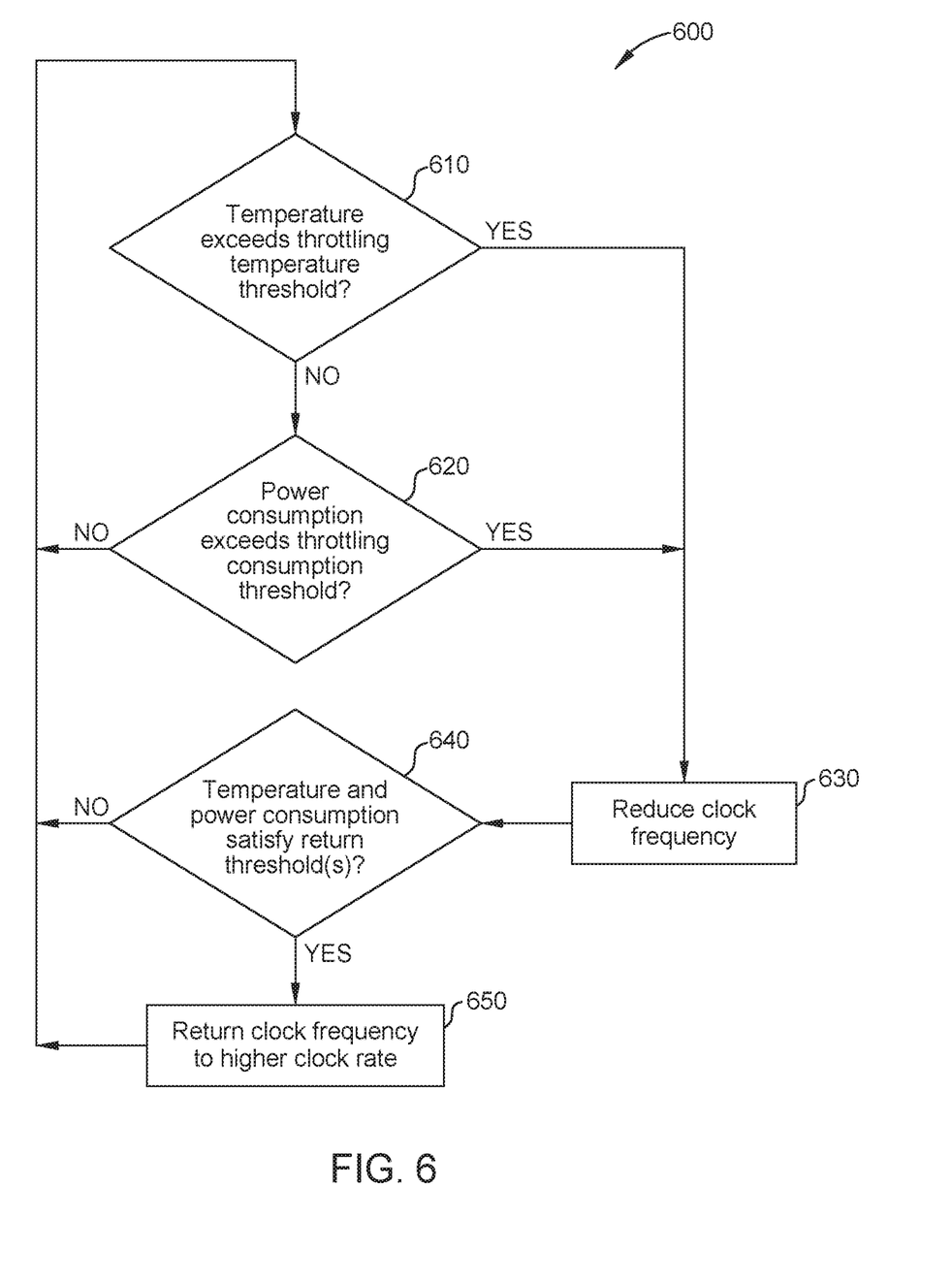
FIG. 6 is a flowchart of a method for power and temperature driven clock throttling, according to an example To facilitate understanding, identical reference numerals have been used, where possible, to designate identical elements that are common to the figures. It is contemplated that elements of one example may be beneficially incorporated in other examples.

FIG. 6 is a flowchart of a method 600 for power and temperature driven clock throttling, according to an example. At block 610, the microcontroller 130 determines whether the temperature readings 410 exceed a temperature threshold 415 for the card 110. At block 620, the microcontroller 130 determines whether the power consumption readings exceed a power consumption threshold 425 for the card 110. In some embodiments, the temperature or power readings are measured based on running averages of temperature or power consumption during a time window. Similarly, in some embodiments, the temperature or power readings are measured based on an average from several sensors 150 located at different locations on the card 110. For example, by measuring aggregate power consumption across a plurality of IP cores on the card 110, individual IP cores of the plurality of IP cores can consume an amount of power that exceeds an average power consumption for the plurality of IP cores that would exceed the power consumption threshold. Accordingly, a designer can use the IP cores to their full capacity, so long as not every IP core is operating at full capacity at the same time.

In response to determining that at least one of the temperature (per block 610) or the power consumption (per block 620) exceeds an associated threshold, method 600 proceeds to block 630 to throttle a dock that controls logical operations performed on the card 110. Otherwise, method 600 returns to block 610 to continue monitoring the temperature (per block 610) and power consumption (per block 620) of the card 110.

At block 630, the microcontroller 130 throttles a clock that controls logical operations performed on the card 110 by buffering a dock signal in a clock skipping controller 145 that receives an input clock signal from the clock at a first frequency and outputs a throttled dock signal with a second frequency lower than the first frequency to the computing resources/logic blocks on the card 110.

At block 640, the microcontroller 130 determines whether the temperature and power consumption readings satisfy associated return thresholds that indicate that the power consumption and the temperature of the card 110 have returned to a level at which throttling can be removed from the clock signal.

When the temperature and power consumption readings are not below the return thresholds (per block 640), method 600 returns to block 610 to continue monitoring the temperature (per block 610) and power consumption (per block 620) of the card 110, and the microcontroller 130 can further throttle the clock signal based on additional thresholds.

When the temperature and power consumption readings are below the return thresholds, method 600 proceeds to block 650 where the microcontroller 130 returns the clock frequency to an higher clock rate. In some embodiments, the microcontroller 130 returns the throttled clock rate to an initial clock rate, while in other embodiments, the microcontroller 130 increases the throttled clock rate to a new rate that is lower than the initial clock rate. For example, the microcontroller 130 can reduce the clock rate from the initial clock rate to a first throttled clock rate and increase the first throttled clock rate to a second dock rate that is intermediate to the first dock rate and the initial dock rate before returning the dock rate to the initial clock rate.

Method 600 may operate as a loop where the clock rate is continuously throttled up and throttled down based on the temperature and power consumption measured on the card 110.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A peripheral device comprising:
   a communication interface configured to couple to a host;
   a dynamic clock configured to generate a clock signal that changes based on at least one of a power consumption in the peripheral device or a temperature of the peripheral device, wherein the dynamic clock comprises:
      a static clock source that produces a static clock signal with an initial clock rate of a fixed frequency,
      a plurality of pattern registers that hold a pattern that indicates what portions of the static clock signal are to be skipped,
      clock skipping logic configured to generate a clock enable signal based on the pattern stored in the plurality of pattern registers, and
      a clock enable pin configured to receive the static clock signal and output, in response to the clock enable signal, the clock signal with a dynamic clock rate less than the initial clock rate; and
   computing resources configured to perform operations offloaded from the host to the peripheral device via the communication interface, wherein the operations are performed at a performance rate set by the clock signal.

2. The peripheral device of claim 1, wherein the pattern sequentially clusters passing at least two clock cycles of the static clock signal together with skipping at least two clock cycles of the static clock signal.

3. The peripheral device of claim 1, wherein a clock rate of the dynamic clock is throttled down from an initial clock rate in response to the power consumption in the peripheral device exceeding a power consumption threshold or the temperature in the peripheral device exceeding a temperature threshold.

4. The peripheral device of claim 3, wherein the clock rate is returned to the initial clock rate from being throttled down in response to the power consumption in the peripheral device satisfying a second power consumption threshold or the temperature in the peripheral device satisfying a second temperature threshold.

5. The peripheral device of claim 3, wherein the power consumption threshold is set based on a running average of power consumed by the peripheral device over a predefined period of time.

6. The peripheral device of claim 1, wherein the computing resources include a given number of logic blocks, wherein a power consumption threshold for the peripheral device divided by the given number of logic blocks defines an average power consumption ceiling, and wherein individual logic blocks can consume more power than the average power consumption ceiling without the peripheral device exceeding the power consumption threshold.

7. The peripheral device of claim 1, further comprising:
a second peripheral device comprising:
a second communication interface coupled to the host;
a second dynamic clock configured to generate a second clock signal that changes based on at least one of a second power consumption in the second peripheral device or a second temperature of the second peripheral device; and
second computing resources configured to perform second operations offloaded from the host to the second peripheral device via the second communication interface, wherein the second operations are performed at a second performance rate set by the second clock signal.

8. An integrated circuit, comprising:
a communication interface;
a dynamic clock configured to generate a clock signal that changes based on at least one of a power consumption in the integrated circuit or a temperature of the integrated circuit; and
computing resources configured to perform operations provided to the integrated circuit via the communication interface, wherein the operations are performed at a performance rate set by the clock signal, wherein the computing resources include a given number of logic blocks, wherein a power consumption threshold for a peripheral device divided by the given number of logic blocks defines an average power consumption ceiling, and wherein individual logic blocks can consume more power than the average power consumption ceiling without the peripheral device exceeding the power consumption threshold.

9. The integrated circuit of claim 8, wherein the dynamic clock includes:
a static clock source that produces a static clock signal with an initial clock rate of a fixed frequency; and
a plurality of pattern registers that hold a pattern that indicates what portions of the static clock signal are to be skipped to thereby produce the clock signal with a dynamic clock rate less than the initial clock rate.

10. The integrated circuit of claim 9, wherein the pattern sequentially clusters passing at least two clock cycles of the static clock signal together with skipping at least two clock cycles of the static clock signal.

11. The integrated circuit of claim 8, wherein the power consumption threshold is set based on a running average of power consumed by the integrated circuit over a predefined period of time.

12. The integrated circuit of claim 8, wherein a clock rate of the dynamic clock is throttled down in response to the power consumption in the integrated circuit exceeding a power consumption threshold or the temperature in the integrated circuit exceeding a temperature threshold.

13. The integrated circuit of claim 12, wherein the clock rate is returned to an initial clock rate from being throttled down in response to the power consumption in the integrated circuit satisfying a second power consumption threshold or the temperature in the integrated circuit satisfying a second temperature threshold.

14. An integrated circuit, comprising:
a communication interface;
a dynamic clock configured to generate a clock signal that changes based on a power consumption in the integrated circuit; and
computing resources configured to perform operations provided to the integrated circuit via the communication interface, wherein the operations are performed at a performance rate set by the clock signal,
wherein the computing resources include a plurality of logic blocks distributed in the integrated circuit, wherein each logic block operates up to associated individual power consumption thresholds, where a sum of the individual power consumption thresholds is greater than a power consumption threshold for the integrated circuit.

15. A method, comprising:
determining that a power consumption for a card exceeds a power consumption threshold by measuring aggregate power consumption across a plurality of intellectual property (IP) cores on the card, wherein at least one IP core of the plurality of IP cores consumes an amount of power that exceeds an average power consumption for the plurality of IP cores; and
in response to determining that the power consumption exceeds the power consumption threshold, reducing a clock frequency of a clock that controls logical operations performed on the card.

16. The method of claim 15, wherein throttling the clock further comprising:
buffering a clock signal received from the clock at a first frequency to a second frequency lower than the first frequency.

17. The method of claim 15, further comprising:
in response to the power consumption of the card returning below the power consumption threshold, returning the clock to a higher clock rate.

18. The method of claim 17, wherein the power consumption is measured based on a running average of the power consumption in a time window.

* * * * *